US007643519B2

(12) United States Patent
Devereux et al.

(10) Patent No.: US 7,643,519 B2
(45) Date of Patent: Jan. 5, 2010

(54) PRE-PROCESSING AND PACKETIZING DATA IN ACCORDANCE WITH TELECOMMUNICATION PROTOCOL

(75) Inventors: Steve Devereux, Folsom, CA (US); Rodney B. Rubert, Rescue, CA (US); Timothy Verrall, Pleasant Hill, CA (US)

(73) Assignee: Intel Corporation, Santa Clara, CA (US)

( * ) Notice: Subject to any disclaimer, the term of this patent is extended or adjusted under 35 U.S.C. 154(b) by 268 days.

(21) Appl. No.: 11/393,306

(22) Filed: Mar. 29, 2006

(65) Prior Publication Data

US 2007/0263606 A1 Nov. 15, 2007

(51) Int. Cl.
*H04J 3/02* (2006.01)
(52) U.S. Cl. .................. 370/537; 370/229; 370/235; 370/466; 370/469; 370/473; 379/93.05; 379/93.06; 709/247
(58) Field of Classification Search ............ 379/93.05, 379/93.06; 370/356, 354, 230.1, 229–235, 370/466–467, 473, 537–538, 542, 469, 540–541, 370/476; 709/247
See application file for complete search history.

(56) References Cited

U.S. PATENT DOCUMENTS

| 6,275,505 | B1 * | 8/2001 | O'Loughlin et al. ........ 370/473 |
| 6,578,084 | B1 * | 6/2003 | Moberg et al. .............. 709/236 |
| 6,944,151 | B1 * | 9/2005 | Menard ..................... 370/353 |
| 7,010,615 | B1 * | 3/2006 | Tezuka et al. .............. 709/246 |
| 7,023,987 | B1 * | 4/2006 | Prentice ................. 379/413.03 |
| 7,263,362 | B1 * | 8/2007 | Young et al. ................ 455/450 |
| 7,263,609 | B1 * | 8/2007 | Wante et al. ................ 713/160 |
| 7,505,472 | B1 * | 3/2009 | Becker Hof et al. ......... 370/401 |
| 2002/0067731 | A1 * | 6/2002 | Houston et al. ............ 370/401 |
| 2004/0184479 | A1 * | 9/2004 | Yamauchi et al. .......... 370/466 |
| 2005/0025178 | A1 * | 2/2005 | Shirota et al. .............. 370/466 |
| 2005/0068981 | A1 * | 3/2005 | Park et al. .................... 370/466 |
| 2005/0141504 | A1 * | 6/2005 | Rembert et al. ............ 370/392 |
| 2005/0159181 | A1 * | 7/2005 | Gadgil et al. ............ 455/554.2 |

OTHER PUBLICATIONS

"Layer 2 Tunneling Protocol," Cisco System, Inc., 4 pgs.
"Layer 2 Tunneling Protocol Version 3 Technical Overview," Cisco System, Inc., 11 pgs.

* cited by examiner

*Primary Examiner*—Hemant Patel
*Assistant Examiner*—Carlos R Araujo
(74) *Attorney, Agent, or Firm*—Schwabe, Williamson & Wyatt, P.C.

(57) ABSTRACT

Embodiments of apparatuses, articles, methods, and systems for pre-processing and packetizing data for transmission in accordance with a transmission protocol are generally described herein. Other embodiments may be described and claimed.

12 Claims, 4 Drawing Sheets

PRE-PROCESSING AND PACKETIZING DATA IN ACCORDANCE WITH TELECOMMUNICATION PROTOCOL

FIELD

Embodiments of the present invention relate generally to the field of communication networks, and more particularly to pre-processing and packetizing data in accordance with a telecommunication protocol for transmission over said networks.

BACKGROUND

A communication network may comply with any of a number of telecommunication protocols designed to standardized communications between network nodes. These protocols may provide, e.g., common data representation, authentication, error detection/correction techniques, etc. As with any technologies, protocols, and the infrastructures to support them, evolve with time. Often significant investments into an infrastructure supporting a particular protocol may be lost due to an industry trend that moves away from that protocol. Conversion specific systems routers have been developed to provide backward compatibilities with some legacy protocols. However, these systems often require multiple devices, e.g., a sequence of routers, and/or provide limited flexibility to support both legacy and modern data communications.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1:
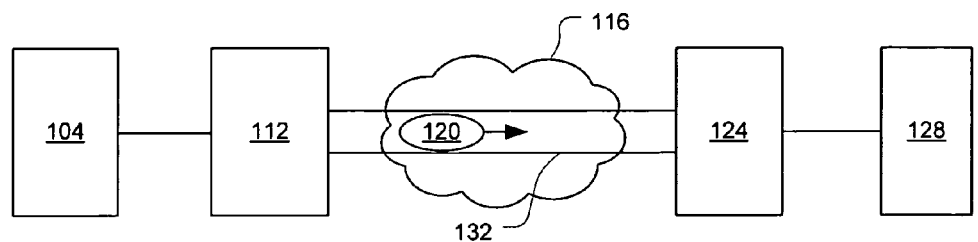
FIG. 1 illustrates a system for transmitting data over networks of varying protocols in accordance with an embodiment of this invention.

Embodiments of the present invention may provide a method, apparatus, and system for pre-processing and packetizing data for transmission in accordance with a transmission protocol over one or more communication networks.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present invention, the phrase "A/B" means A or B. For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)." For the purposes of the present invention, the phrase "(A)B" means "(B) or (AB)," that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

In general, unless the context dictates otherwise, elements of embodiments may be similar to, and substantially interchangeable with, like-named elements described in other embodiments.

As used herein, the term "component" is intended to refer to programming logic that may be employed to obtain a desired outcome. The term component may be synonymous with "module" or "agent" and may refer to programming logic that may be embodied in hardware or firmware, or in a collection of software instructions, possibly having entry and exit points, written in a programming language, such as, for example, C++.

A software component may be compiled and linked into an executable program, or installed in a dynamic link library, or may be written in an interpretive language such as BASIC. It will be appreciated that software components may be callable from other components or from themselves, and/or may be invoked in response to detected events or interrupts. Software instructions may be embedded in firmware, such as an electrically erasable programmable read-only memory ("EEPROM"), or may be stored on a readable medium such as a magnetic or optical storage device. It will be further appreciated that hardware components may be comprised of connected logic units, such as gates and flip-flops, and/or may be comprised of programmable units, such as programmable gate arrays or processors. In some embodiments, the components described herein are implemented as software modules, but nonetheless may be represented in hardware or firmware. Furthermore, although only a given number of discrete software/hardware components may be illustrated and/or described, such components may nonetheless be represented by additional components or fewer components without departing from the spirit and scope of embodiments of the invention.

In various embodiments, software components may be implemented by a variety of processing elements (either single- or multi-core) such as, but not limited to, processors, digital signal processors ("DSPs"), application specific integrated-circuits ("ASICs"), and/or controllers.

In certain scenarios, e.g., due to migration of portions of a telecommunications system, having the capability to route data over a variety of telecommunication protocols may facilitate operation of the system. This may be especially true when pockets of legacy networks, e.g., frame relay (FR) networks, are isolated from one another. In these embodiments, it may be helpful to leverage a disparate network for the transport between said isolated networks. In particular, the proliferation of publicly-available Internet Protocol (IP) networks provide for an attractive transport option. Various embodiments described below teach pre-processing of data for routing in a destination network, e.g., a FR network, and packetization of the data for transmission to the destination network via a transport network, e.g., an IP network.

While embodiments discussed hereinbelow may reference FR and IP networks/protocols, it may be understood that in other embodiments other networks/protocols may be additionally/alternatively employed.

FIG. 1 illustrates a system 100 for transmitting data over networks of a variety of telecommunication protocols in accordance with an embodiment of this invention. In this embodiment a source 104 may provide data traffic 108, which may be in any of a variety of formats, to a packetization platform 112. The packetization platform 112 may receive the data traffic 108 and packetize it into a packet, e.g., IP packet 120, for transport over a network, e.g., an IP network 116. The packet 120 may be received by a packetization platform 124 and forwarded to destination 128. In various embodiments, the source 104 and/or destination 128 may include a network of a protocol different than the IP network 116, e.g., a FR protocol.

In an embodiment, the data transmitted from the source 104 to the destination 128 may be voice data to be routed, at least in part, over a FR virtual circuit. In this embodiment, the voice data may be routed through the IP network 116 and through another network, e.g., an FR network, in the destination 128. Therefore, in some embodiments, the packetization platform 112 may pre-process the data to facilitate routing through the FR network as well as packetizing the data for routing through the IP network 116.

In various embodiments, an FR virtual circuit may be a permanent virtual circuit (PVC). A PVC may facilitate repeated communication between two terminals without the need for repeated setups, clearing, etc., which may, in turn, facilitate voice communications between the two terminals. In a PVC connection, any switching in the actual communications route may be imperceptible to the end users.

In various embodiments and as used herein, reference to "FR" and "IP" may refer to telecommunication protocols compatible with the link layer (Layer 2) and network layer (Layer 3) of the Open Systems Interconnect (OSI) model, respectively. These references may include any versions, revisions, instantiations, etc. of the particular protocols. For example, a reference to IP may refer to IPv4 (as described in Internet Engineering Task Force (IETF) Request for Comments (RFC) 791, September 1981), IPv6 (e.g., IETF RFC 2460, December 1998; IETF RFC 3513, April 2003, etc.), etc.

In an embodiment, the voice data may be encapsulated into a tunneling packet compatible with a tunneling protocol, e.g., generic route encapsulation (GRE) protocol, prior to packetization into the IP packet 120. In this embodiment, transmission of the IP packet 120 over the IP network 116 may be considered to take place through a GRE tunnel 132 having a source endpoint at the packetization platform 112 and a destination endpoint at the packetization platform 124. In an embodiment, the GRE tunnel 132 may be stateless in that neither of the endpoints keep information about the state or availability of the other endpoint. This may provide flexibility to endpoints independent of connectivity issues.

The IP packet 120 may be received at the endpoint of the GRE tunnel 132 by the packetization platform 124. The packetization platform 124 may identify the IP packet 120 by its unique source and destination loop back addresses of the endpoints of the GRE tunnel 132. This identification may enable the packetization platform 124 to provide complementary operations to the packetization platform 112 such as, e.g., un-encapsulation, authentication, and/or decryption, of the IP packet 120.

Identification of the IP packet 120 while in the GRE tunnel 132 may also facilitate priority routing, which may enable delay-intolerant communications through a network supporting differentiated services for quality of service (QOS) transmissions. For example, in an embodiment, the system 100 may tunnel voice over frame relay (VoFR) VoFR packets via the IP network 116. In this embodiment, VoFR packets in the GRE tunnel 132 may be placed in low latency queues (LLQ), thereby reducing disruptions to the voice communications.

In some embodiments, tunnel encapsulation may be compatible with GRE as described by the IETF RFC 2784 released March 2000, along with any versions, revisions, instantiations, etc.

In various embodiments, packetization platforms 112 and/or 124 may be capable of performing a variety of operations such as, but not limited to, packetizing, un-packetizing, encapsulating, un-encapsulating, authentication, encoding, decoding, routing, switching, etc.

In various embodiments, the source 104 and/or destination 128 may include a variety of equipment, terminals, networks, etc. In an embodiment, the source 104 and/or destination 128 may include one or more voice and/or data networks such as, but not limited to, a private branch exchange, a public switched telephone network (PSTN), integrated services digital network (ISDN), and/or a computer network (e.g., local area network (LAN), wide area network (WAN), metropolitan area network (MAN), personal area network (PAN), Internet, etc.).

Figure 2:
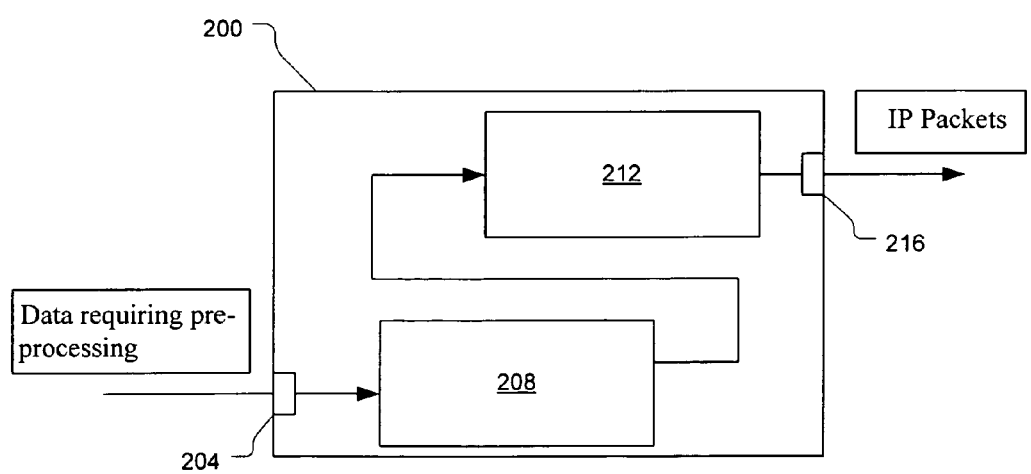
FIG. 2 illustrates a packetization platform in accordance with an embodiment of this invention.

FIG. 2 illustrates a packetization platform 200 in accordance with an embodiment of this invention. The packetization platform 200 may be similar to, and substantially interchangeable with, other packetization platforms described herein. Therefore, the packetization platform 200 may be described in the context of the system 100.

In this embodiment the packetization platform 200 may be a device having an input port 204 to receive data requiring pre-processing. The input port 204 may be coupled to a pre-processing module 208. In an embodiment, the pre-processing module 208 may be configured to perform one or more pre-processing operations on data received through the input port 204. For example, in an embodiment, voice data may be input to the packetization platform 200 at the input port 204 that will eventually travel, at least a portion of its entire transmission route from source 104 to, and through destination 128, through a FR network. Therefore, in this embodiment, the pre-processing module 208 may perform FR packetization operations, e.g., packetizing voice data into a VOFR packet to facilitate routing through the FR network.

The packetization platform 200 may also include a packetization module, e.g., an IP packetization module 212, coupled to the pre-processing module 208. The IP packetization module 212 may receive the VOFR packet from the pre-processing module 228 and perform packetization operations to facilitate routing of the VOFR packet through the IP network 116, e.g., encapsulate the VOFR packet into the IP packet 120. The IP packet 120 may then be output through an output port 216.

As used herein, packetization may include addition of information to a data payload that may facilitate the routing of the data payload through a network. Encapsulation, as used herein, may be a form of packetization in which a data packet of a first data structure is encapsulated into a data packet of second data structure.

In various embodiments, the packetization platform 200 may include a plurality of input ports 204, which may be coupled to the pre-processing module 208.

Figure 3:
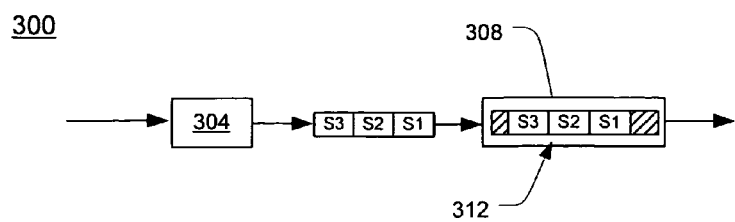
FIG. 3 illustrates a pre-processing module in accordance with an embodiment of this invention.

FIG. 3 illustrates a pre-processing module 300 in accordance with an embodiment of this invention. The pre-processing module 300 may be similar to, and substantially interchangeable with, other pre-processing modules described herein.

In some embodiments, the pre-processing module 300 may include a signal processor, e.g., digital signal processor (DSP) 304, configured to receive voice data and to digitize voice data into blocks S1-S3. The blocks S1-S3 may be transmitted to a FR packetization module 308 to packetize the blocks S1-S3 into a VOFR packet 312.

Figure 4:
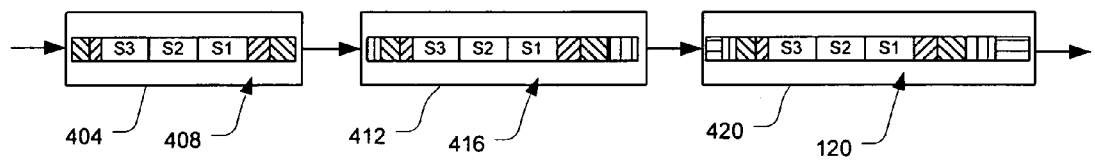
FIG. 4 illustrates an IP packetization module in accordance with another embodiment of this invention.

FIG. 4 illustrates an IP packetization module 400 in accordance with an embodiment of this invention. The IP packetization module 400 may be similar to, and substantially interchangeable with, other IP packetization modules described herein.

The IP packetization module 400 may receive a packet, e.g., VoFR packet 312, from a pre-processing module, and perform various operations to facilitate secure and timely routing through, e.g., the IP network 116. In some embodiments, the IP packetization module 400 may include an encapsulation chain configured to provide a series of encapsulation operations to received traffic.

In this embodiment, the IP packetization module 400 may include a tunnel encapsulator 404 configured to receive the VoFR packet 312, and encapsulate it into a tunneling packet, e.g., GRE packet 408. The encapsulator 308 may then transmit the GRE packet 408 to a security encapsulator 412.

The security encapsulator 412 may encapsulate the GRE packet 408 into a security packet, e.g., an IP security (IPSec) packet 416. The IPSec packet 416 may provide encryption and/or authentication protections to the GRE packet 408 through the additions of headers (e.g., encapsulating security payload (ESP) extension headers, authentication headers (AH), etc.) and/or using key exchanges, e.g., Internet key exchange (IKE). The security encapsulator 412 may then transmit the IPSec packet 416 to a network-layer encapsulator 420.

The network-layer encapsulator 420 may encapsulate the IPSec packet 416 into a transport packet, e.g., IP packet 120. The IP packet 120 may provide the appropriate addressing and/or control information to enable routing through the IP network 116 to the packetization platform 124.

In various embodiments, and as briefly mentioned above, information about transmission characteristics, e.g., QOS, LLQ, IPSec process, etc., of the IP packet 120 may be communicated to the components of the IP network 116 and/or to the packetization platform 124 at least in part on the identification of the unique source and destination loop back addresses of the GRE tunnel 132.

Figure 5:
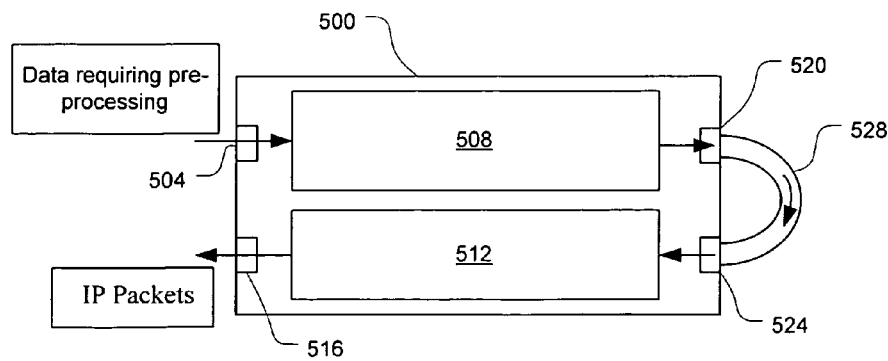
FIG. 5 illustrates a packetization platform in accordance with another embodiment of this invention.

FIG. 5 illustrates a packetization platform in accordance with an embodiment of this invention. The packetization platform 500 may be similar to, and substantially interchangeable with, other packetization platforms described herein. Therefore, the packetization platform 500 may be described in the context of the system 100.

The packetization platform 500 may have an input port 504, a pre-processing module 508, an IP packetization module 512, and an output port 516, similar to like-named elements of packetization platform 200. However, in this embodiment the packetization platform 500 may include an additional output port 520 coupled to the pre-processing module 508, and an additional input port 524 coupled to the IP packetization module 512. In this embodiment, the output port 520 may be coupled to the input port 524 by an external link, e.g., a cable 528. In another embodiment, the output port 520 may be coupled to the input port 524 by an internal link, e.g., a trace.

In an embodiment, one or more of the ports of the packetization platform 500 may be provided by a serial interface card. In various embodiments, the serial interface card may be a removable peripheral component. In various embodiments, one or more of the aforementioned ports may be directly integrated within the packetization platform 500, e.g., such that it is not a removable peripheral component. In various embodiments, other ports may be embodied in removable interface cards.

This embodiment may facilitate dynamic configuration of the packetization platform 500.

Figure 6:
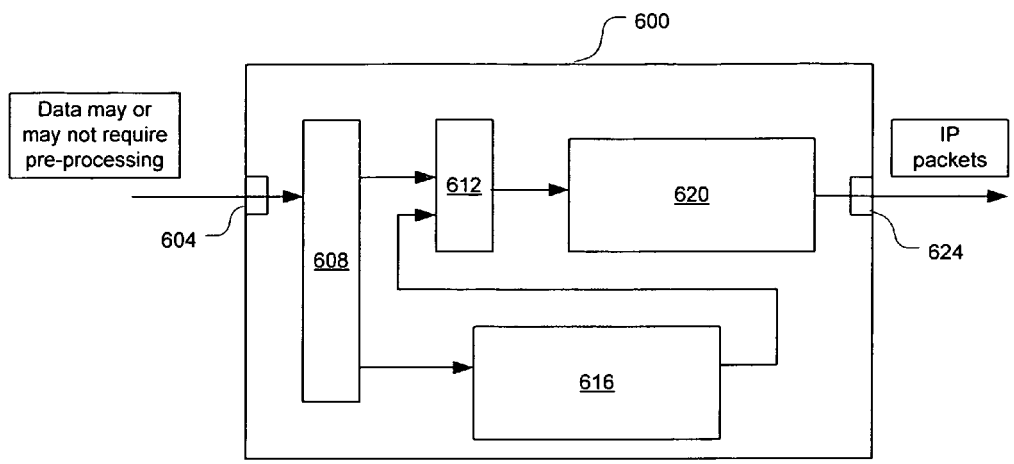
FIG. 6 illustrates a packetization platform in accordance with another embodiment of this invention.

FIG. 6 illustrates a packetization platform 600 in accordance with an embodiment of this invention. The packetization platform 600 may be similar to, and substantially interchangeable with, other packetization platforms described herein. Therefore, the packetization platform 600 may be described in the context of the system 100.

The packetization platform 600 may include an input port 604 to receive data that may or may not require pre-processing. The packetization module 600 may include a selector 608 coupled to the input port 604 to receive the data. The selector 608 may selectively output data received through the input port 604 not requiring pre-processing to another selector 612.

The selector 608 may also selectively output data received through the input port 604 requiring pre-processing to a pre-processing module 616. In an embodiment, the pre-processing module 616 may output data, e.g., a VoFR packet, to the selector 612.

The selector 612 may selectively output the data not requiring pre-processing received from the selector 612 and the data processed by the pre-processing module 616 to an IP packetization module 620. In an embodiment, the selectively output data from the selector 612 may be serialized.

The IP packetization module 620 may packetize data received from the selector 612 as, e.g., IP packet 120, for transmission over the IP network 116 and output the data via the output port 624.

In various embodiments, the selector 608 and/or selector 612, may include a controller coupled to a multiplexer. The controller may include selection logic to facilitate selection and/or serialization operations as described herein.

The packetization platform 600 may provide for the flexibility to implement a single device capable of handling a variety of data transmission routines. For example, the packetization platform 600 may be capable of both general data transmissions and more particularized VoFR packet transmissions via the IP network 116 to facilitate FR routing at the destination 128.

Figure 7:
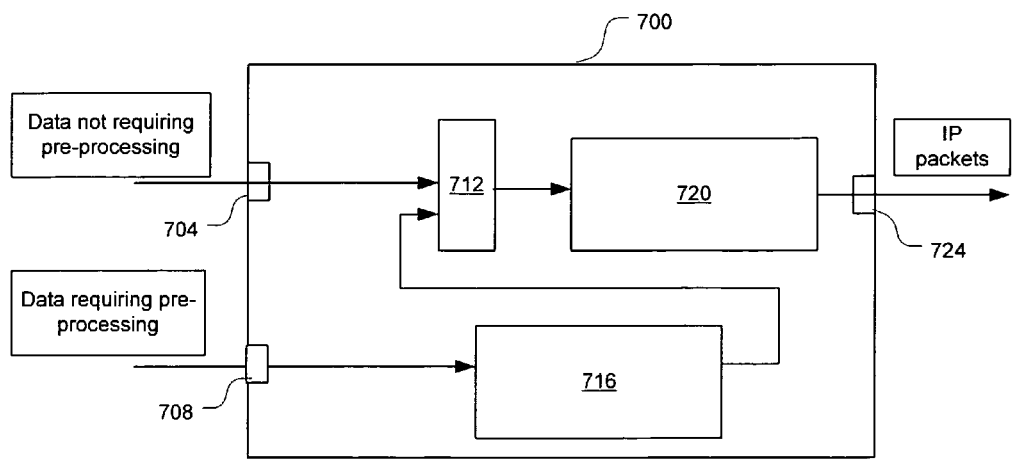
FIG. 7 illustrates a packetization platform in accordance with another embodiment of this invention.

FIG. 7 illustrates a packetization platform 700 in accordance with an embodiment of this invention. The packetization platform 700 may be similar to, and substantially interchangeable with, other packetization platforms described herein. Therefore, the packetization platform 700 may be described in the context of the system 100.

In this embodiment, the packetization platform 700 may include an input port 704 and an input port 708. The input port 704 may be a dedicated port to receive data not requiring pre-processing. A selector 712, which may be similar to selector 612 described above, may be coupled to the input port 704 to receive said data not requiring pre-processing.

In an embodiment, the input port 708 may be a dedicated port to receive data requiring pre-processing. A pre-processing module 716 may be coupled to the input port 708 to receive said data requiring pre-processing and to perform operations resulting in, e.g., a VoFR packet.

The selector 712 may also be coupled to the output of the pre-processing module 716 and may be configured to selectively output data not requiring pre-processing received from the port 704 and the processed data received from the pre-processing module 716 to an IP packetization module 720.

The IP packetization module 720 may packetize received data, e.g., as IP packet 120, for transmission over the IP network 116 and output the data via output port 724.

Figure 8:
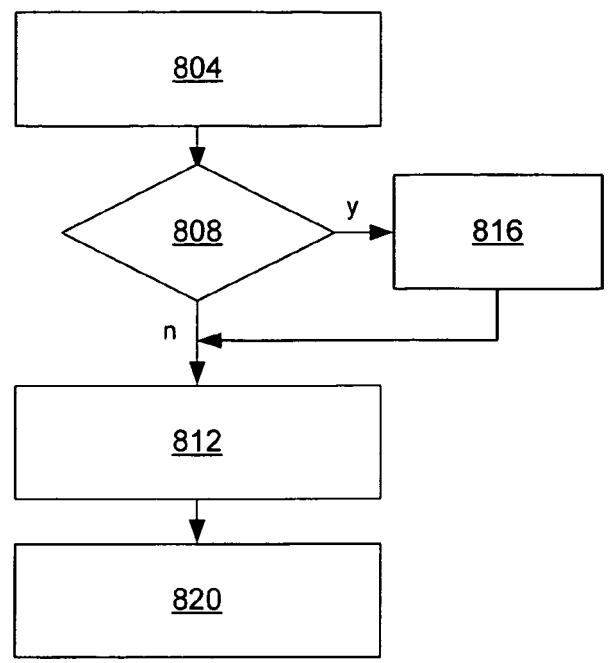
FIG. 8 illustrates a packetization operation in accordance with an embodiment of this invention.

FIG. 8 illustrates operational phases in accordance with an embodiment of this invention. A packetization platform may receive data 804. The packetization module may determine whether the data requires one or more pre-processing operations 808. In various embodiments, this determination may be an active determination, e.g., by a selector configured to receive data of either type and selectively output the data according to the type, or a passive determination, e.g., by receiving data of one type at one input port and data of another type at another input port.

If the data is of a type that does not require pre-processing, the data may be packetized for transport 812 as, e.g., an IP packet. If the data is of a type that requires pre-processing, the packetization platform may perform one or more pre-processing processing operations 816 prior to packetizing the data for transport 812. The packetization platform may then transmit the IP packet 820 from an output port.

Figure 9:
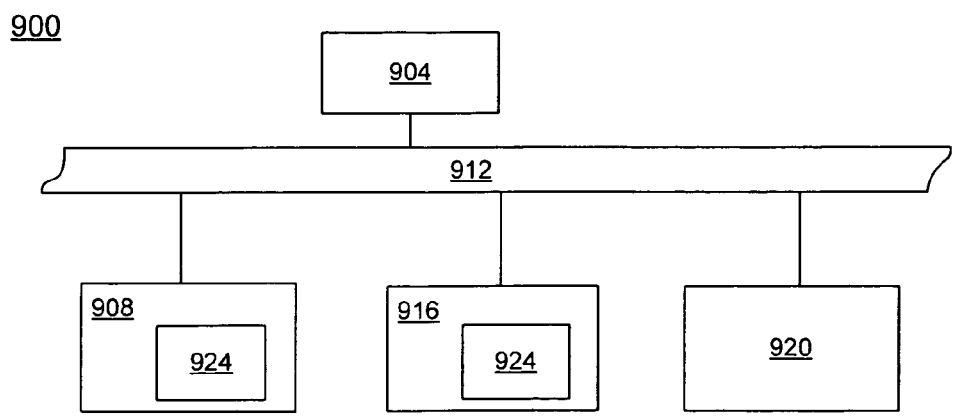
FIG. 9 illustrates a computing device for implementing a packetization platform in accordance with an embodiment of this invention.

FIG. 9 illustrates a computing device 900 capable of implementing an packetization platform in accordance with various embodiments. As illustrated, for the embodiments, computing device 900 includes processor 904, memory 908, and bus 912, coupled to each other as shown. Additionally, computing device 900 includes storage 916, and communication interfaces 920 coupled to each other, and the earlier described elements as shown. The communication interfaces 920 may include any and all of the interfaces/ports described above.

Memory 908 and storage 916 may include in particular, temporal and persistent copies of packetization logic 924, respectively. The packetization logic 924 may include instructions that when accessed by the processor 904 result in the computing device 900 performing operations or executions described in conjunction with the packetization platforms in accordance with embodiments of this invention. In particular, the accessing of the packetization logic 924 by the processor 904 may facilitate packetization, routing, selection, coupling, and/or encapsulation operations of the platforms as described above in connection with various embodiments.

In various embodiments, the memory 908 may include RAM, dynamic RAM (DRAM), static RAM (SRAM), synchronous DRAM (SDRAM), dual-data rate RAM (DDRRAM), etc.

In various embodiments, the processor 904 may include one or more single-core processors, multiple-core processors, controllers, application specific integrated circuits (ASICs), etc.

In various embodiments, storage 916 may include integrated and/or peripheral storage devices, such as, but not limited to, disks and associated drives (e.g., magnetic, optical), universal serial bus (USB) storage devices and associated ports, flash memory, read-only memory (ROM), non-volatile semiconductor devices, etc.

In various embodiments, storage 916 may be a storage resource physically part of the computing device 900 or it may be accessible by, but not necessarily a part of, the computing device 900. For example, the storage 916 may be accessed by the computing device 900 over a network.

In various embodiments, computing device 900 may have more or less elements, and/or different architectures. In various embodiments, computing device 900 may be a router, a switch, a general-purpose computing device, a network access device, etc.

While the present invention has been described in terms of the foregoing embodiments, those skilled in the art will recognize that the invention is not limited to the embodiments described. Other embodiments may be practiced with modification and alteration within the spirit and scope of the appended claims. Accordingly, the description is to be regarded as illustrative instead of restrictive.

What is claimed is:

1. An apparatus comprising:
   an input port of the apparatus to receive data;
   a first selector with an input coupled to the input port of the apparatus, configured to analyze data received from the input port to determine portions of the data associated with a first protocol and portions associated with a second protocol;
   a pre-processing module with an input coupled to a first output of the first selector, configured to perform one or more pre-processing operations on the portions of the data associated with the first protocol;
   a second selector with a first input coupled to a second output of the first selector and with a second input coupled to an output of the pre-processing module, configured to selectively output the portions of the data associated with the second protocol from the first selector and the pre-processed portions of the data associated with the first protocol from the pre-processing module; and
   a packetization module with an input coupled to an output of the second selector, configured to packetize the portions of the data associated with the second protocol and the pre-processed portions of the data associated with the first protocol for transmission.

2. The apparatus of claim 1, wherein the portions of the data associated with the first protocol comprise voice data to be routed over a virtual circuit, and the pre-processing module is configured to packetize the voice data for routing over the virtual circuit.

3. The apparatus of claim 1, wherein the first protocol is frame relay protocol.

4. The apparatus of claim 1, wherein the second protocol is an Internet Protocol.

5. The apparatus of claim 1, wherein the packetization module is further configured to encapsulate the data into a tunneling packet.

6. The apparatus of claim 5, wherein the tunneling packet comprises a generic route encapsulation packet.

7. The apparatus of claim 5, wherein the packetization module is further configured to encapsulate the tunneling packet into a security packet.

8. The apparatus of claim 7, wherein the security packet comprises an Internet Protocol security process packet.

9. An article of manufacture, comprising:
   a computer readable storage unit; and
   a plurality of programming instructions stored on the storage unit and configured to program and enable a machine, when the programming instructions are executed by a processor of the machine, to receive data at an input port;

analyze, by a first selector, the data received at the input port to determine portions of the data associated with a first protocol and portions associated with a second protocol;

perform, by a pre-processing module, one or more pre-processing operations on the portions of the data associated with the first protocol;

packetize, by a packetization module, the portions of the data associated with the second protocol and the pre-processed portions of the data associated with the first protocol for transmission in accordance with the second protocol; and selectively output, by a second selector, the portions of the data associated with the second protocol received from the first selector and the pre-processed portions of data associated with the first protocol to be packetized.

10. The article of manufacture of claim 9, wherein the portions of the data associated with the first protocol comprise voice data to be routed over a virtual circuit and the associated instructions, and the programming instructions are further configured to enable the machine to process, by the pre-processing module, the voice data for routing over the virtual circuit, before packetize the voice data for transmission.

11. The article of manufacture of claim 9, wherein the first protocol is frame relay protocol.

12. The article of manufacture of claim 9, wherein the second protocol is an Internet Protocol.

* * * * *